United States Patent [19]

Bois

[11] Patent Number: 5,238,138

[45] Date of Patent: Aug. 24, 1993

[54] COOKING APPARATUS SUCH AS FOR EXAMPLE A DEEP FAT FRYER

[75] Inventor: Bernard M. Bois, Caen, France

[73] Assignee: Moulinex (Societe Anonyme), Bagnolet, France

[21] Appl. No.: 924,473

[22] Filed: Aug. 4, 1992

[30] Foreign Application Priority Data

Aug. 14, 1991 [FR] France ............... 91 10361

[51] Int. Cl.$^5$ ............................................. B65D 43/00
[52] U.S. Cl. ................................. 220/334; 220/335
[58] Field of Search ............... 220/394, 244, 246, 334, 220/335, 337, 342, 343, 912

[56] References Cited

U.S. PATENT DOCUMENTS

| | | | |
|---|---|---|---|
| 2,279,666 | 4/1942 | Etnyre | 220/334 X |
| 2,523,872 | 9/1950 | McCloskey | 220/334 X |
| 2,778,053 | 1/1957 | Hess et al. | 220/334 X |
| 2,991,904 | 7/1961 | Carideo | 220/335 X |
| 3,001,227 | 9/1961 | Long et al. | 220/334 X |
| 3,432,967 | 3/1969 | Simon | 220/334 X |
| 4,111,372 | 9/1978 | Hicks | 241/37.5 |
| 4,779,753 | 10/1988 | Capy | 220/334 X |
| 5,067,625 | 11/1991 | Numata | 220/335 X |

FOREIGN PATENT DOCUMENTS

| | | |
|---|---|---|
| 0183281 | 6/1986 | European Pat. Off. . |
| 0406750 | 1/1991 | European Pat. Off. . |
| 2239223 | 2/1975 | France . |

*Primary Examiner*—Steven M. Pollard
*Attorney, Agent, or Firm*—Young & Thompson

[57] ABSTRACT

Cooking apparatus, e.g. a deep fat fryer, comprising an open housing (1) adapted to be closed by a cover (2) pivotably removably mounted on an upper edge (3) of the housing by disassemblable hinges. A device (5) for automatically raising the cover permits the cover (2) to pass from a closed position to an open position. The hinges comprise two spaced bearings (6, 7) secured to the upper edge (3) of the housing and arranged on a common axis parallel to that edge, as well as two pivots (8, 9) secured to the cover (2) and mounted on the bearings (6, 7). One of the bearings (7) comprises a portion (10) axially retractable against the action of a compression spring (11) so as to permit the separation of the bearing (7) and the pivot (9) so as to unhinge the cover (2). The automatic raising device (5) of the cover comprises on the cover (2) an inside abutment (17) and on the housing (1) a finger (18) slidably mounted against the action of an elastic member (20) in a recess (19) of the housing (1) on an axis transverse to the axis of the bearings (6, 7), so as to occupy at least two positions, namely, a raised position to which it is brought by the elastic member (20) and in which it bears on the abutment (17) of the cover, maintaining the cover (2) in open position, and a lowered position to which it is brought by pressure from the abutment (17) acting against the elastic member (20) when the cover (2) is closed.

13 Claims, 1 Drawing Sheet

COOKING APPARATUS SUCH AS FOR EXAMPLE A DEEP FAT FRYER

The invention relates to a cooking apparatus such as, for example, a deep fat fryer comprising an open housing adapted to be closed by a cover pivotably removably mounted on an upper edge of the housing via a disassemblable hinge means and a device for automatically raising the cover permitting the cover to move from a locked closed position to an open position.

In known apparatus of this type, the disassemblable hinge means of the cover on the housing is generally constituted by a hinge comprising a metal axle mounted in a bearing secured to the housing and on which the cover pivots, while the device for automatically raising the cover is constituted by a coil spring mounted concentrically to the axis and of which a free end is attached to the cover and of which the other end is secured to the housing such that the spring will be in torsion when the cover is maintained in the locked closed position and substantially without torsion when the cover occupies its open position after unlocking.

In this type of apparatus, the disassembly is a complicated operation, difficult to practice, particularly because of the presence on the axle of the spring whose ends must be secured with care. Moreover, even if the cover is washable, the axle and the spring are directly subjected to spattering of grease, which rapidly dirties them and makes the cleaning operation particularly difficult.

The invention has for its object to overcome these drawbacks, and particularly to provide an apparatus in which the cover will be easily disassemblable and will be completely washable while at the same time being particularly economical and adapted to be produced easily by mass production.

According to the invention, the hinge means comprises two spaced bearings secured to the upper edge of the housing and arranged on a common axis parallel to said edge, as well as two pivots fixed to the cover and mounted on the said bearings, one of the bearings comprising a portion which is axially retractable against the action of elastic means so as to permit the separation of the hinge and the pivot so as to remove the cover.

It will thus be understood that, by the use of two bearings of which one comprises a retractable portion, the disassembly of the cover is particularly easy. Thus, it suffices for the user to push the retractable part so as to disengage the corresponding pivot of the cover, then to disengage the second bearing from the other pivot by translation of the cover. Moreover, the cover once disassembled will include only the two pivots because, as will be understood, the rest of the articulation means (bearings, retractable portion, elastic means) is secured to the housing, the cover is thus completely washable, even in a dishwasher. Moreover, the articulation means comprises only a minimum of pieces, it is economical and particularly adapted for mass production.

The characteristics and advantages of the invention will be further apparent from the description which follows, by way of example, with reference to the accompanying drawing, in which.

Figure 1:
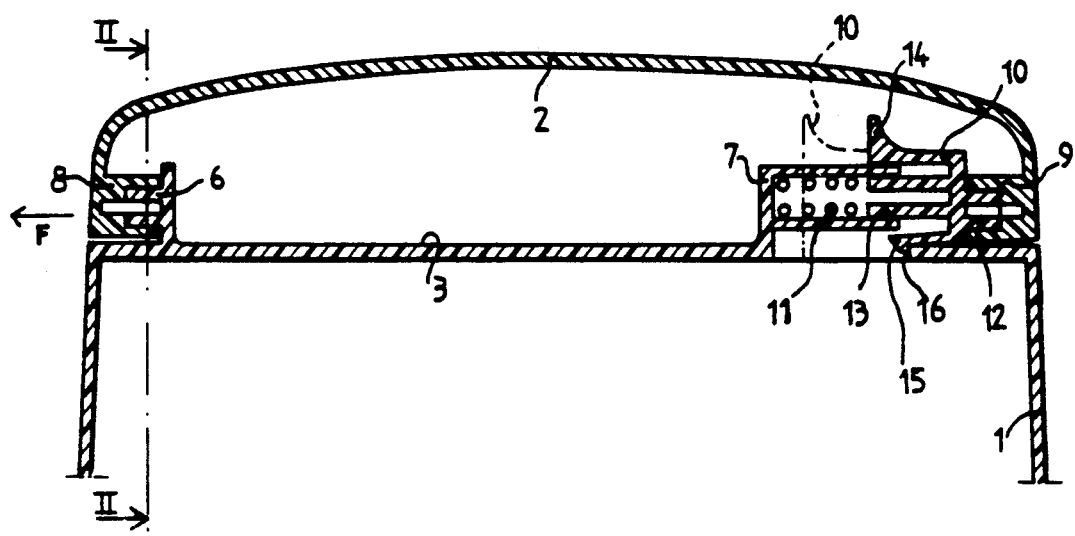
FIG. 1 is a fragmentary cross sectional view of cooking apparatus showing a disassemblable articulation means for a cover on a housing according to the invention, the cover being closed.
Figure 2:
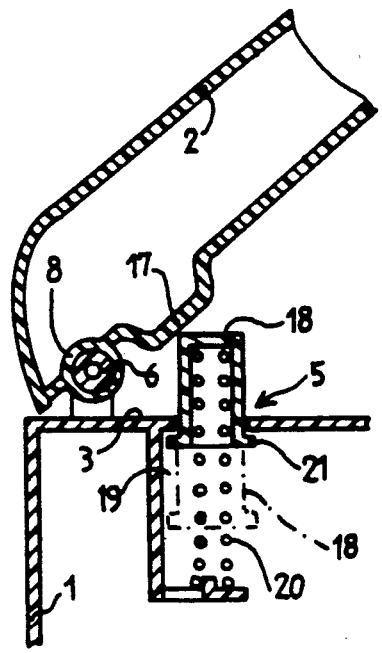
FIG. 2 is a transverse cross sectional view on the line II—II of FIG. 1, showing an automatic raising device of the cover according to the invention, the cover being open.

The cooking apparatus, as shown partially in FIG. 1, is for example a deep fat fryer and comprises an open housing 1 adapted to be closed by a cover 2 mounted articulately removably on an upper edge 3 of the housing 1 by disassemblable articulation means and a device 5 for automatically raising the cover permitting the cover 2 to move from a locked closed position (FIG. 1) to an open position (FIG. 2).

According to the invention, the articulation means comprises two spaced bearings 6, 7 secured to the upper edge 3 of the housing 1 and arranged on a common axis parallel to said edge 3, as well as two pivots 8, 9 secured to the cover 2 and mounted on said bearings 6, 7, one of said bearings 7 comprising a portion 10 axially retractable against the action of elastic means 11 so as to permit the separation of the bearing 7 and the pivot 9 so as to unhinge the cover 2.

Preferably, the retractable portion 10 comprises, on the one hand, a first end 12 adapted to be received in the corresponding pivot 9 of the cover 2 and, on the other hand, a second end 13 mounted slidably in the corresponding bearing 7 so as to occupy two positions, namely a locked position (shown in full line in FIG. 1) in which the first end 12 is received within said pivot 9, and a retracted position (shown in broken lines in FIG. 1) in which the retractable portion 10 is brought by translation against the action of elastic means 11 by the user and in which the first end 12 is retracted from said pivot 9.

The elastic means 11 is preferably a coil compression spring and is disposed within the bearing 7 secured to the housing. Thus, the spring is protected from any spattering of oil or grease and other soiling.

Thanks to this hinge arrangement, the disassembly of the cover 2 is particularly easy to perform. The cover 2 being open, the user presses the retractable portion 10 against elastic means 11 so that the first end 12 of the retractable portion 10 disengages from the corresponding pivot 9, while the second end 13 slides in the bearing 7. Then the user axially displaces the cover 2 to the left (arrow F) such that the other pivot 8 will be disengaged from the corresponding bearing 6. Finally the user removes the cover 2 which has thus been freed. As only the pivots 8, 9 remain on the cover 2, it is easy to clean it, even in a dishwasher. On the housing there remain only the bearings 6, 7 and the retractable portion 10, which are easily washable with a sponge.

To reassemble the cover 2, the user performs the reverse operations from the preceding.

The retractable portion 10 comprises also, on the one hand, a lug 14 so as to facilitate the retraction by the user and, on the other hand, a hook 15 adapted to come into bearing against a notch 16 in the upper edge 3 of the housing 1 so as to prevent the escape of the second end 13 and thus of the spring 11 from the corresponding bearing 7 when the cover 2 is disassembled.

Thus the hook 15 facilitates the assembly and disassembly of the cover, and maintains the retractable portion 10 in a predetermined position fixed to the housing, thereby preventing any instability of the cover.

The cover 2, the housing 1 and the retractable portion 10 are molded in plastic material such as for example polypropylene, which is particularly economical and easy to work with.

As shown in FIG. 2 and according to another advantageous characteristic of the invention, the automatic raising device 5 of the cover comprises on the cover 2 an internal abutment 17 and on the housing 1 a finger 18 slidably mounted in a recess 19 in the housing 1 along an axis transverse to the axis of the bearings 6, 7 under the urging of an elastic member 20 which can for example be a coil compression spring disposed within the recess 19. The finger 18 can be of plastic material. This finger 18 can occupy at least two conditions, either a raised condition (shown in full lines in FIG. 2) to which it is brought by said elastic member 20 and in which it bears on the abutment 17 of the cover 2, maintaining the cover 2 in open position, or a lowered position (shown in broken lines in FIG. 2) to which it is brought by the pressure of the abutment 17 against the action of said elastic member 20 when the cover 2 is closed. There can thus be provided, on finger 18, a flange 21 adapted to come into bearing against the edge of recess 19 so as to prevent the finger 18 from leaving the recess 19 when the cover 2 is disassembled.

Thus, there is obtained a reliable raising device 5, independent from the articulation means and therefore which does not impede the mounting and dismounting of the cover 2. Thus, the connection between the cover 2 and the raising device 5 is at but a single point and, when the user removes the cover 2, the raising device 5 will remain fixed to the housing 1. Moreover, this device 5 is easy to make because the elastic member 20 is protected from spattering of oil or grease by the finger 18 itself as well as by the edge 21 which prevents grease from penetrating into recess 19. For cleaning, it suffices therefore simply to wipe off the upper edge 3 of the housing 1 and to wipe off the finger 18.

What is claimed is:

1. Cooking apparatus comprising an open housing (1) adapted to be closed by a cover (2) pivotably removably mounted on an upper edge (3) of the housing by disassemblable hinge means which permit the cover (2) to pass from a closed position to an open position, wherein the hinge means comprises two spaced bearings (6, 7) secured to the upper edge (3) of the housing and arranged on a common axis parallel to said edge, as well as two pivots (8, 9) secured to the cover (2) and mounted on said bearings (6, 7), one of said bearings (7) comprising a portion (10) axially retractable against the action of elastic means (11) so as to permit the separation of said one bearing (7) and the corresponding pivot (9) so as to unhinge the cover (2).

2. Cooking apparatus according to claim 1, wherein the retractable portion (10) comprises a first end (12) adapted to be engaged with said corresponding pivot (9) of the cover (2) and a second end (13) slidably mounted in said one bearing (7) so as to occupy two positions, namely, a locking position in which said first end (12) is engaged with said corresponding pivot (9), and a retracted position in which the retractable portion (10) is moved by translation against the action of the elastic means (11) and in which said first end (12) is disengaged from said corresponding pivot (9).

3. Cooking apparatus according to claim 2, wherein the retractable portion (10) comprises a lug (14) that facilitates retraction and a hook (15) adapted to come into abutment against a notch (16) on the upper edge (3) of the housing (1) so as to prevent the escape of said second end (13) of the retractable portion (10) from said one bearing (7) when the cover (2) is disassembled.

4. Cooking apparatus according to claim 1, wherein the elastic means (11) is disposed within said one bearing (7) secured to the housing (1).

5. Cooking apparatus according to claim 1, wherein the cover (2), the housing (1) and the retractable portion (10) are molded of plastic material.

6. Cooking apparatus according to claim 5, wherein said plastic material is polypropylene.

7. Cooking apparatus according to claim 1, further comprising an automatic raising device (5) of the cover, which comprises on the cover (2) an inside abutment (17) and on the housing (1) a finger (18) slidably mounted against the action of an elastic member (20) in a recess (19) of the housing (1) on an axis transverse to the axis of the bearings (6, 7), so as to occupy at least two positions, namely, a raised position to which it is brought by said elastic member (20) and in which it bears on the abutment (17) of the cover, maintaining the cover (2) in open position, and a lowered position to which it is brought by pressure from the abutment (17) acting against said elastic member (20) when the cover (2) is closed.

8. Cooking apparatus according to claim 7, wherein the finger (18) is of plastic material.

9. Cooking apparatus according to claim 1, which is a deep fat fryer.

10. Cooking apparatus comprising an open housing (1) adapted to be closed by a cover (2) pivotably mounted on an upper edge (3) of the housing by hinge means comprising bearing means (6, 7) secured to the upper edge (3) of the housing and arranged on an axis parallel to said edge, and an automatic raising device (5) of the cover which comprises a finger (18) engageable with an underside of the cover and slidably mounted for movement relative to the housing against the action of an elastic member (20) in a recess (19) of the housing (1) on an axis transverse to the axis of the bearing means (6, 7), so as to occupy at least two positions, namely, a raised position to which it is brought by said elastic member (20) and in which it bears on said underside of the cover, maintaining the cover (2) in open position, and a lowered position to which it is brought by pressure from the cover (2) acting against said elastic member (20) when the cover (2) is closed.

11. Cooking apparatus according to claim 10, wherein the finger (18) is of plastic material.

12. Cooking apparatus according to claim 10, wherein there is an abutment (17) on said underside of the cover (2) and said finger (18) slides against said abutment during movement of said cover (2) between said raised and lowered positions.

13. Cooking apparatus according to claim 10, which is a deep fat fryer.

* * * * *